(12) United States Patent
Pujol et al.

(10) Patent No.: US 12,297,712 B2
(45) Date of Patent: May 13, 2025

(54) STARTER ENGINE SYSTEM FOR A ROTARY LOCK

(71) Applicant: SCHLUMBERGER TECHNOLOGY CORPORATION, Sugar Land, TX (US)

(72) Inventors: Jean-Luc Pujol, Quarante (FR); Sebastien Poveda, Lespignan (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 294 days.

(21) Appl. No.: 17/996,559

(22) PCT Filed: Apr. 21, 2021

(86) PCT No.: PCT/US2021/028315
§ 371 (c)(1),
(2) Date: Oct. 19, 2022

(87) PCT Pub. No.: WO2021/216649
PCT Pub. Date: Oct. 28, 2021

(65) Prior Publication Data
US 2023/0203907 A1    Jun. 29, 2023

Related U.S. Application Data

(60) Provisional application No. 63/013,217, filed on Apr. 21, 2020.

(51) Int. Cl.
*E21B 33/06*    (2006.01)
*F16D 125/40*   (2012.01)
*F16D 125/44*   (2012.01)

(52) U.S. Cl.
CPC ........ *E21B 33/062* (2013.01); *F16D 2125/40* (2013.01); *F16D 2125/44* (2013.01)

(58) Field of Classification Search
USPC ........................................................ 166/85.4
See application file for complete search history.

(56) References Cited

U.S. PATENT DOCUMENTS

| | | |
|---|---|---|
| 4,969,390 A | 11/1990 | Williams, III |
| 6,006,647 A | 12/1999 | Van Winkle |
| (Continued) | | |

FOREIGN PATENT DOCUMENTS

| | | | |
|---|---|---|---|
| CN | 105416305 A | * | 3/2016 |
| JP | 2008069818 A | | 3/2008 |
| (Continued) | | | |

OTHER PUBLICATIONS

Search Report and Written Opinion of International Patent Application No. PCT/US2021/028315 on Jul. 30, 2021; 10 pages.

(Continued)

*Primary Examiner* — Matthew R Buck
*Assistant Examiner* — Douglas S Wood
(74) *Attorney, Agent, or Firm* — Jeffrey D. Frantz

(57) ABSTRACT

A rotary lock system includes a gear configured to be driven to rotate via an engine. The rotary lock system includes a rotatable starter component configured to engage the gear via an interface. The interface includes a circumferential gap to enable the gear to rotate through an angle before contacting and driving the rotatable starter component.

20 Claims, 10 Drawing Sheets

(56) References Cited

U.S. PATENT DOCUMENTS

| | | | | |
|---|---|---|---|---|
| 6,543,594 | B1* | 4/2003 | Fuhrer | F16D 13/683 |
| | | | | 192/53.32 |
| 7,300,033 | B1* | 11/2007 | Whitby | E21B 33/062 |
| | | | | 166/85.4 |
| 9,957,771 | B2* | 5/2018 | Jaffrey | E21B 33/061 |
| 2008/0048139 | A1* | 2/2008 | Whitby | E21B 33/062 |
| | | | | 251/1.3 |
| 2014/0033842 | A1* | 2/2014 | Morin | F16H 19/04 |
| | | | | 74/89.17 |
| 2017/0191337 | A1 | 7/2017 | Rey | |
| 2019/0003275 | A1* | 1/2019 | Deul | E21B 33/062 |
| 2020/0136356 | A1* | 4/2020 | Schall | H02B 3/00 |
| 2020/0156512 | A1* | 5/2020 | Teraguchi | B60N 2/2362 |
| 2020/0229455 | A1* | 7/2020 | Perez | B01D 37/00 |
| 2020/0284274 | A1* | 9/2020 | van Kuilenburg | E21B 33/062 |
| 2022/0136356 | A1* | 5/2022 | Poveda | E21B 34/16 |
| | | | | 166/373 |
| 2022/0228455 | A1* | 7/2022 | Pujol | F15B 15/261 |
| 2023/0203907 | A1* | 6/2023 | Pujol | E21B 4/006 |
| | | | | 251/1.3 |
| 2024/0240535 | A1* | 7/2024 | Berthaud | E21B 33/062 |

FOREIGN PATENT DOCUMENTS

| | | |
|---|---|---|
| WO | 2013155206 A2 | 10/2013 |
| WO | 2020169714 A1 | 8/2020 |

OTHER PUBLICATIONS

International Search Report and Written Opinion issued in International Patent application PCT/US2022/072237 on Sep. 2, 2022, 10 pages.

* cited by examiner

STARTER ENGINE SYSTEM FOR A ROTARY LOCK

CROSS-REFERENCE TO RELATED APPLICATION

This application claims priority to and the benefit of U.S. Provisional Application No. 63/013,217, entitled "STARTER ENGINE SYSTEM" and filed Apr. 21, 2020, and International Application No. PCT/US2021/028315, entitled "STARTER ENGINE SYSTEM FOR A ROTARY LOCK" and filed Apr. 21, 2021, which are incorporated by reference herein in their entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A blowout preventer (BOP) stack is installed on a wellhead to seal and control an oil and gas well during drilling operations. A drill string may be suspended inside a drilling riser from a rig through the BOP stack into the wellbore. During drilling operations, a drilling fluid is delivered through the drill string and returned up through an annulus between the drill string and a casing that lines the wellbore. In the event of a rapid invasion of formation fluid in the annulus, commonly known as a "kick," a movable component within the BOP stack may be actuated to seal the annulus and to control fluid pressure in the wellbore, thereby protecting well equipment disposed above the BOP stack. In some cases, a cavity lock system may also be operated to lock the movable component to maintain the seal in the annulus.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
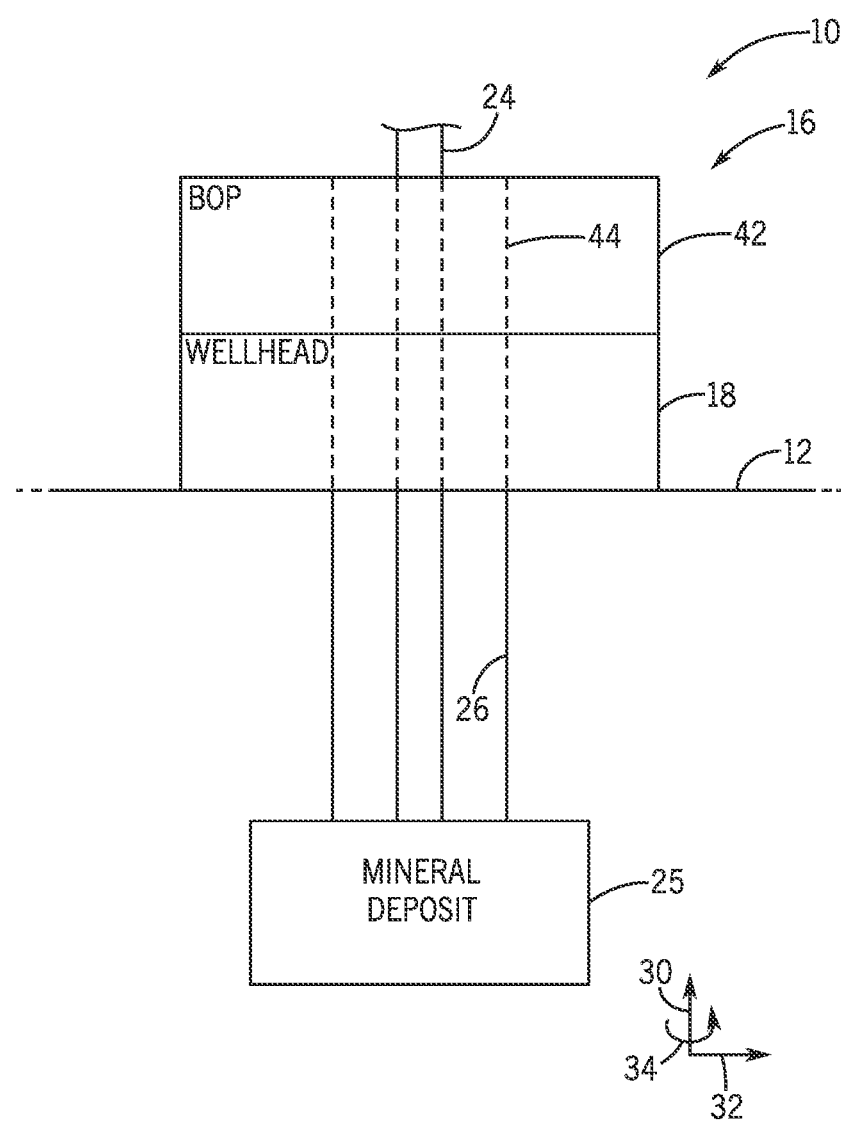
FIG. 1 is a block diagram of a mineral extraction system, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to a starter engine system (e.g., clutch system), which may be used as part of a rotary lock system. Furthermore, the rotary lock system may be adapted to operate as a cavity lock system to lock one or more rams of a blowout preventer (BOP). For example, each ram may be configured to adjust from an initial ram position (e.g., open position; first position) in which the ram is withdrawn from a central bore of the BOP to a final ram position (e.g., closed position; second position) in which the ram is positioned within the central bore of the BOP. The rotary lock system may include one or more lock members (e.g., locking screws), and each lock member may be configured to adjust from an unlock position (e.g., a first lock member position) in which the lock member does not block movement of the ram to a lock position (e.g., a second lock member position) in which the lock member locks the ram in the final ram position (e.g., to block the movement of the ram from the final ram position to the initial ram position; to block withdrawal/movement of the ram backward from the central bore).

The starter engine system includes an engine, such as a rotary engine (e.g., electric, hydraulic) that provides torque, which increases from zero to a maximum torque after a defined time (e.g., after a defined number of turns). Advantageously, as discussed in more detail herein, the starter engine system enables the rotary engine to provide a full torque to the lock member (e.g., at initial application of torque to the lock member) to effectively and reliably unlock the rotary lock system (e.g., to retract the lock member) and allow freedom to the rams to open and close. The starter engine system achieves this via a circumferential gap between a driven gear of a gear box that is coupled to the rotary engine and a rotatable starter component that is coupled to (e.g., fastened to) the lock member. The circumferential gap enables the driven gear of the gear box to rotate through an angle without driving a stem (e.g., a main axis) that is coupled to the lock member, and thus, the rotary engine completes a number of turns (e.g., the defined number of turns) before initial application of torque to the rotatable starter component that is coupled to the lock member.

As used herein, the full torque may be the maximum torque for the rotary engine or a high torque that is higher than an initial torque during one or more initial turns of the rotary engine (e.g., from stationary or zero torque). The starter engine system may also enable use of a small, low-power rotary engine (e.g., as compared to being without the starter engine system) to effectively operate the rotary lock system. The small, low-power rotary engine may enable the rotary lock system to be compact and to be conveniently positioned at a housing of the BOP.

While the disclosed embodiments are described in the context of a drilling system and drilling operations to facilitate discussion, it should be appreciated that the BOP may be adapted for use in other contexts and other operations. As one example, the BOP may be used in a pressure control equipment (PCE) stack that is coupled to and/or positioned vertically above a wellhead during various intervention operations (e.g., inspection or service operations), such as wireline operations in which a tool supported on a wireline is lowered through the PCE stack to enable inspection and/or maintenance of a well. In such cases, the BOP may be adjusted from an open configuration (e.g., open position) to a closed configuration (e.g., closed position (e.g., to seal around the wireline extending through the PCE stack) to isolate the environment, as well as other surface equipment, from pressurized fluid within the well. As another example, the BOP may be used in coil tubing operations. In the present disclosure, a conduit may be any of a variety of tubular or cylindrical structures, such as a drill string, casing, wireline, Streamline™, slickline, coiled tubing, or other spoolable rod. Furthermore, while the disclosed embodiments are described in the context of the BOP, it should be appreciated that the rotary lock system may be employed to lock other components in any of a variety of mineral extraction systems or other types of systems. Indeed, the starter engine system may be employed in any of a variety of rotary lock systems or other types of systems.

With the foregoing in mind, FIG. 1 is a block diagram of an embodiment of a mineral extraction system 10. The mineral extraction system 10 may be configured to extract various minerals and natural resources, including hydrocarbons (e.g., oil and/or natural gas), from the earth, or to inject substances into the earth. The mineral extraction system 10 may be a land-based system (e.g., a surface system) or an offshore system (e.g., an offshore platform system). A BOP assembly 16 is mounted to a wellhead 18, which is coupled to a mineral deposit via a wellbore 26. The wellhead 18 may include any of a variety of other components, such as a spool, a hanger, and a "Christmas" tree. The wellhead 18 may return drilling fluid or mud to the surface 12 during drilling operations, for example. Downhole operations are carried out by a conduit 24 that extends through the BOP assembly 16, through the wellhead 18, and into the wellbore 26.

To facilitate discussion, the BOP assembly 16 and its components may be described with reference to a vertical axis or direction 30, a longitudinal axis or direction 32, and a lateral axis or direction 34. The BOP assembly 16 may include one or more BOPs 42 (e.g., 1, 2, 3, 4, 5, 6, 7, 8 or more ram BOPs) stacked relative to one another. A central bore 44 (e.g., flow bore) extends through the one or more BOPs 42. As discussed in more detail herein, at least one of the BOPs 42 may include a rotary lock system (e.g., a cavity lock system) that is configured to lock the BOP 42 in a closed configuration (e.g., closed position) in which the BOP 42 blocks a fluid flow through the central bore 44. For example, the rotary lock system may drive a lock member toward the central bore 44 to block movement of a ram of the BOP 42 while the ram is positioned within the central bore 44. In this way, the rotary lock system may lock the ram to thereby lock the BOP 42 in the closed configuration in which the BOP 42 blocks the fluid flow through the central bore 44.

Figure 2:
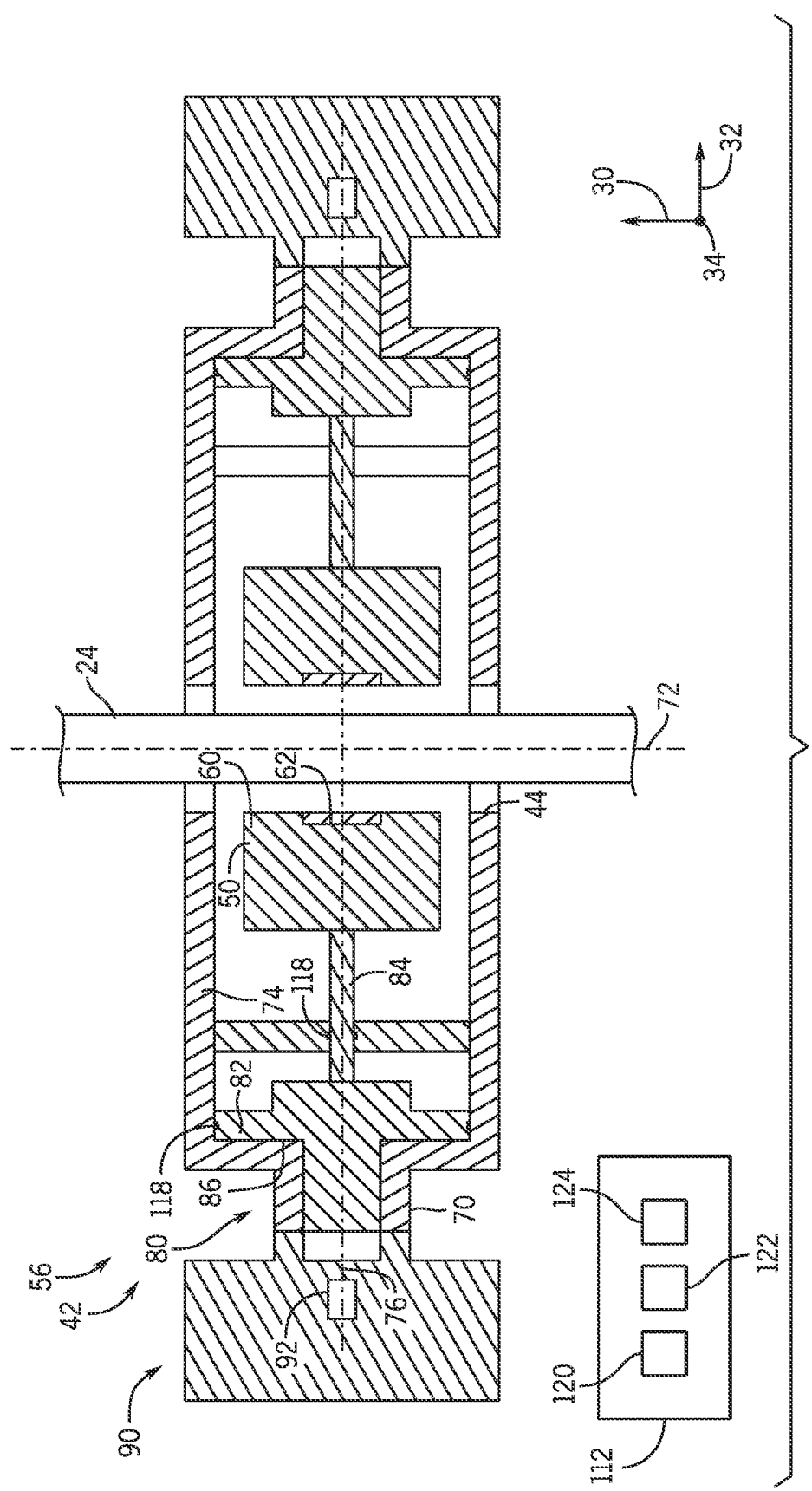
FIG. 2 is cross-sectional side view of a blowout preventer (BOP) that may be used in the mineral extraction system of FIG. 1, wherein rams are withdrawn from a central bore of the BOP, in accordance with an embodiment of the present disclosure.
Figure 3:
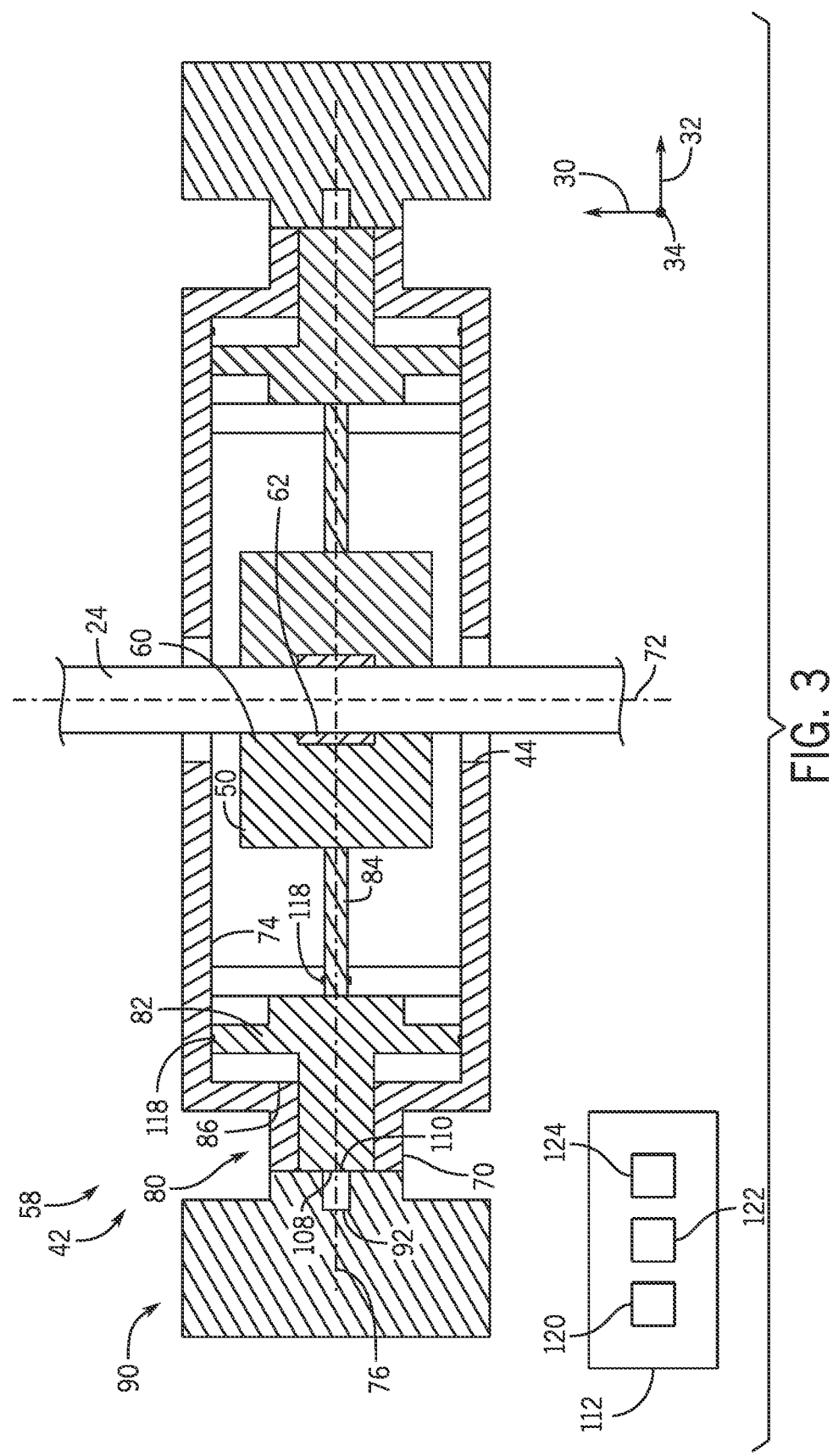
FIG. 3 is a cross-sectional side view of the BOP of FIG. 2, wherein the rams are within the central bore of the BOP, in accordance with an embodiment of the present disclosure.

FIGS. 2 and 3 are cross-sectional side views of an embodiment of a BOP 42 that may be used in the mineral extraction system 10 of FIG. 1. In FIG. 2, each ram 50 of the BOP 42 is in an initial ram position (e.g., open position; first position). In the initial ram position, each ram 50 is withdrawn from the central bore 44, enables a fluid flow through the central bore 44, does not contact the conduit 24, and/or does not contact a corresponding opposed ram 50. In FIG. 3, each ram 50 of the BOP 42 is in a final ram position (e.g., closed position; second position). In the final ram position, the ram 50 extends into the central bore 44, blocks the fluid flow through the central bore 44, contacts the conduit 24, and/or contacts the corresponding opposed ram 50. While the ram 50 is in the initial ram position, the BOP 42 may be in an open configuration 56 (e.g., open position) in which the BOP 42 enables the fluid flow through the central bore 44. While each ram 50 is in the final ram position, the BOP 42 may be in a closed configuration 58 (e.g., closed position) in which the BOP 42 blocks the fluid flow through the central bore 44. For example, each ram 50 may include a ram body 60 and a sealing element 62 (e.g., packer), and the sealing elements 62 of the opposed rams 50 may contact and seal against the conduit 24 to thereby seal an annulus about the conduit 24 to block the fluid flow through the central bore 44. It should be appreciated that the rams 50 may be configured to seal the central bore 44 without the conduit 24 (e.g., the sealing elements 62 of the opposed rams 50 may contact and seal against one another to seal the central bore 44).

As shown, the BOP 42 includes a housing 70 that houses each ram 50. In particular, the central bore 44 has a bore central axis 72 (e.g., aligned with the vertical axis 30) and extends through the housing 70. The housing 70 also defines a cavity 74 (e.g., ram cavity) that has a cavity central axis 76 (e.g., aligned with the longitudinal axis 32) and intersects the central bore 44 (e.g., the bore central axis 72 and the cavity central axis 76 are transverse or orthogonal to one another). This configuration enables each ram 50 to move between the initial position in which the ram 50 is withdrawn from the central bore 44 and positioned within the cavity 74 to the final position in which the ram 50 is positioned within the central bore 44 and extends from cavity 74.

The housing 70 may also house components of an actuator assembly 80 that drives each ram 50 between the initial ram position and the final ram position. For example, in the illustrated embodiment, the actuator assembly 80 includes a respective piston 82 and a respective connecting rod 84 for each ram 50. In operation, upon an increase in wellbore pressure or upon another indication that the BOP 42 should be adjusted to the closed configuration 58, a fluid may be provided into a respective piston cavity 86 to drive the respective pistons 82, as well as the respective connecting rods 84 and the respective rams 50 coupled thereto, toward the central bore 44. In this way, each ram 50 may be driven from the initial ram position of FIG. 2 to the final ram position of FIG. 3. As shown, various seals 118 (e.g., annular seals) may be provided to seal and/or to isolate certain cavities.

While the housing 70 is illustrated as a one-piece housing that encompasses both the rams 50 and the pistons 82 to facilitate discussion, it should be appreciated that the housing 70 may include a first housing that encompasses the rams 50 and a second housing that encompasses the pistons 82. In such cases, the first housing may be a BOP ram housing and the second housing may be a bonnet housing, and the BOP ram housing and the bonnet housing may be coupled to one another (e.g., via fasteners).

As shown, the BOP 42 may include or be associated with a rotary lock system 90 (e.g., cavity lock system) that includes one or more lock members 92. In the illustrated embodiment, one rotary lock system 90 is provided for each ram 50 (e.g., a first rotary lock system and a second rotary lock system positioned on opposite sides of the rams 50 along the longitudinal axis 32). Furthermore, each rotary lock system 90 includes one lock member 92. However, any number of rotary lock systems 90 having any number of lock members 92 (e.g., 1, 2, 3, 4, 5, 6, 7, 8 or more) may be provided in any of a variety of configurations. Additionally, it should be appreciated that the lock members 92 may have any of a variety of configurations (e.g., cross-sectional shapes, sizes, positions) and may move in any of a variety of ways.

Each lock member 92 is configured to move from a first lock position (e.g., unlocked position or configuration), which is shown in FIG. 2, to a second lock position (e.g., locked position or configuration), which is shown in FIG. 3. In the first lock position, the lock member 92 may be withdrawn relative to the housing 70 and does not block movement of the ram 50. In the second lock position, the lock member 92 may be extended relative to the housing 70 and blocks movement of the ram 50 (e.g., via contact with the actuator assembly 80). In particular, the lock member 92 is configured to engage the piston 82 (e.g., a tailrod portion of the piston 82) to block movement of the ram 50 from the final ram position to the initial ram position (e.g., the block withdrawal of the ram 50 from the central bore 44), thereby locking the ram 50 in the final ram position to lock the BOP 42 in the closed configuration 58. As discussed in more detail herein, a starter engine system that includes a rotary engine, a gear box, and a starter engine component may operate to effectively and reliably adjust the lock member 92 to perform locking and unlocking functions for the BOP 42.

With reference to FIG. 3, an actuator-contacting surface 108 (e.g., longitudinally-facing surface) of the lock member 92 may contact with a lock-contacting surface 110 (e.g., longitudinally-facing surface) of the piston 82. In the illustrated embodiment, the lock-contacting surface 110 of the piston 82 faces away from the central bore 44 and/or is a rearmost surface of the piston 82 (e.g., furthest from the central bore 44). However, it should be appreciated that the lock member 92 may be configured to contact and engage another surface of the piston 82 or any other surface of the actuator assembly 80 and/or the ram 50 (e.g., a surface; a recess formed in a surface). Furthermore, while the illustrated embodiment shows the lock member 92 extending and moving longitudinally relative to the housing 70 (e.g., along the longitudinal axis 32), it should be appreciated that the lock member 92 may extend and move laterally (e.g., along the lateral axis 34) and/or vertically (e.g., along the vertical axis 30). For example, instead of or in addition to being positioned on opposite sides of the housing 70 along the longitudinal axis 32, the lock members 92 may be positioned on opposite sides of the housing 70 along the lateral axis 34.

The movement of the ram 50 and the movement of the lock member 92 may be coordinated (e.g., via an electronic controller 112). For example, as the ram 50 moves into the central bore 44 and/or after the ram 50 reaches the final ram position, the electronic controller 112 may control the rotary engine of the rotary lock system 90 to rotate in a first direction to drive the lock member 92 to the second lock position to lock the ram 50 in the final ram position. The movement may be coordinated via an automated control process with or without sensor feedback. In some embodiments, the movement may be coordinated using signals from a sensor, such as position signals from a position sensor configured to monitor the position of the ram 50. To return the lock member 92 to the first lock position, the electronic controller 112 may control the rotary engine of the rotary lock system 90 to rotate in a second direction to drive the lock member 92 to the first lock position to enable the ram 50 to move to the initial ram position.

The electronic controller 112 includes a processor 120 and a memory device 122. In some embodiments, the processor 120 may receive and process signals from a sensor that monitors the pressure within the wellbore to determine that the BOP 42 should be adjusted from the open configuration 56 to the closed configuration 58. In some embodiments, the processor 120 may receive other signals (e.g., operator input) that indicate that the BOP 42 should be adjusted from the open configuration 56 to the closed configuration 58. Then, the processor 120 may provide control signals, such as to the actuator assembly 80 to adjust the rams 50 to the final ram position and to the rotary engine of the rotary lock system 90, in response to the determination or the indication that the BOP 42 should be adjusted from the open configuration 56 to the closed configuration 58.

The electronic controller 112 may be part of or include a distributed controller or control system with one or more electronic controllers in communication with one another to carry out the various techniques disclosed herein. The processor 120 may also include one or more processors configured to execute software, such as software for processing signals and/or controlling the components associated with the rotary lock system 90 and/or the BOP 42. The memory device 122 disclosed herein may include one or more memory devices (e.g., a volatile memory, such as random access memory [RAM], and/or a nonvolatile memory, such as read-only memory [ROM]) that may store a variety of information and may be used for various purposes. For example, the memory device 122 may store processor-executable instructions (e.g., firmware or software) for the processor 120 to execute, such as instructions for processing signals and/or controlling the components associated with the rotary lock system 90 and/or the BOP 42. It should be appreciated that the electronic controller 112 may include various other components, such as a communication device 124 that is capable of communicating data or other information to various other devices (e.g., a remote computing system).

Figure 4:
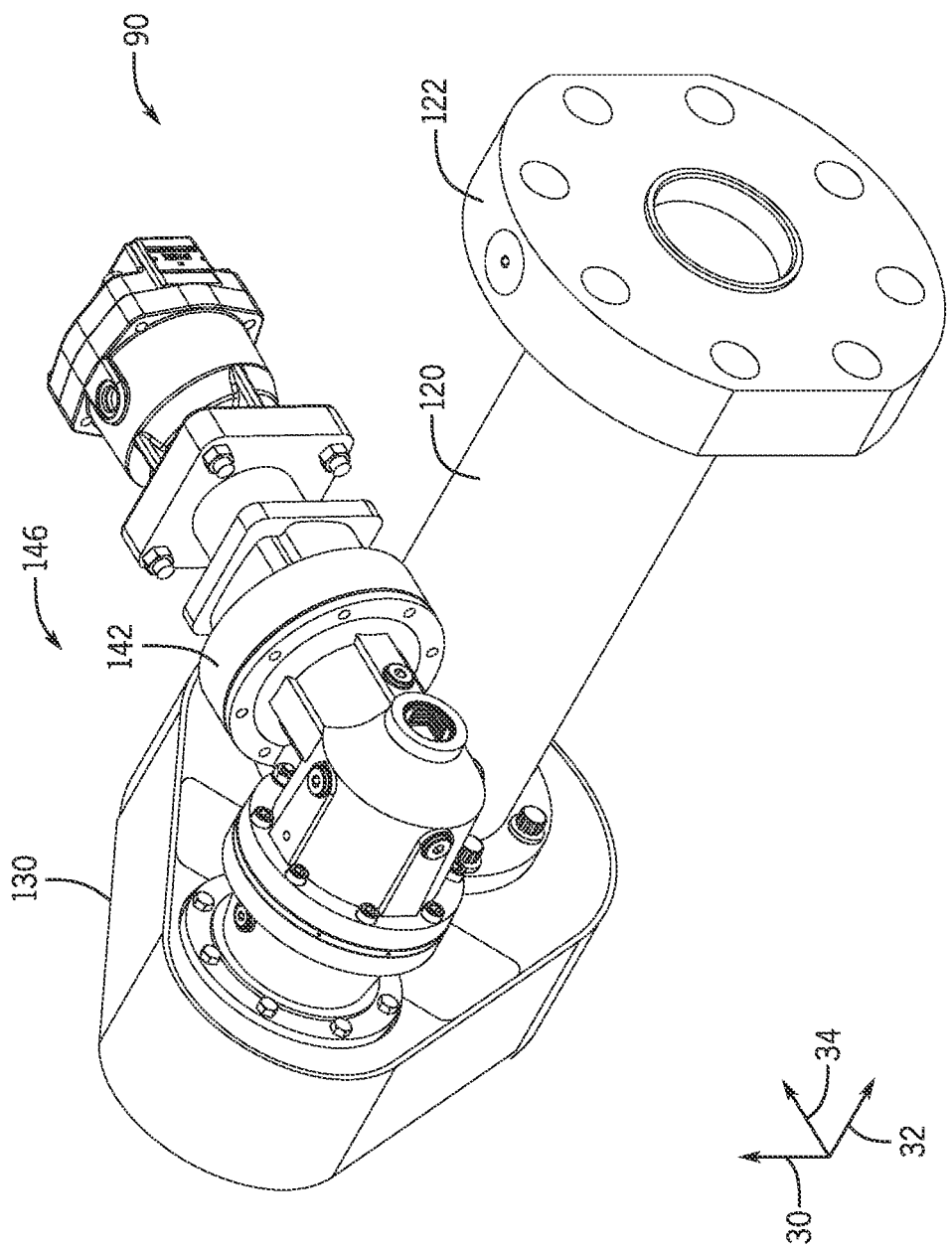
FIG. 4 is a perspective front view of an embodiment of a rotary lock system that may utilized with the BOP of FIGS. 2 and 3, in accordance with an embodiment of the present disclosure.
Figure 5:
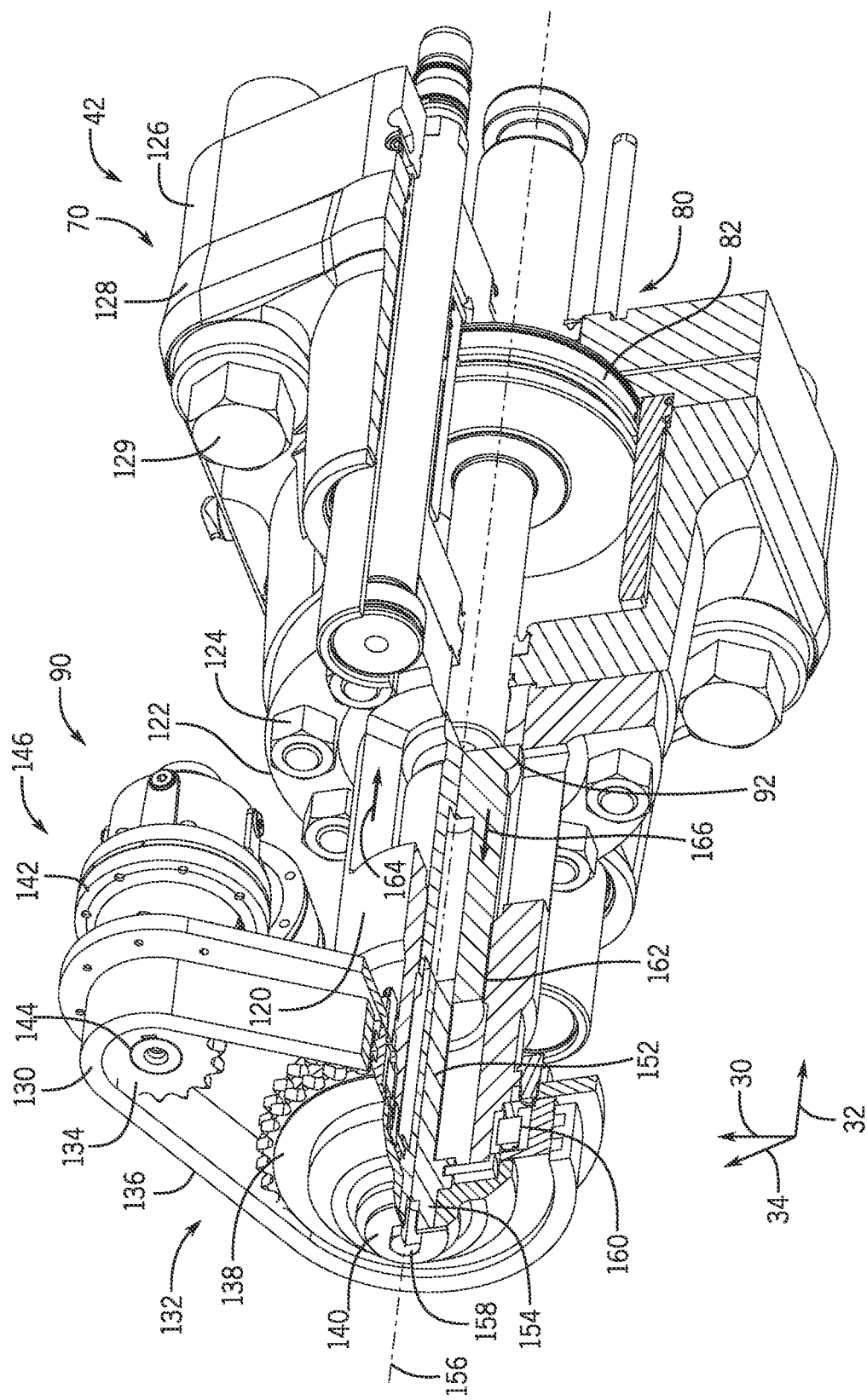
FIG. 5 is a cut-away perspective rear view of the rotary lock system of FIG. 4, in accordance with an embodiment of the present disclosure.

FIGS. 4-10 illustrate various embodiments and features of the rotary lock system 90. In particular, FIG. 4 is a perspective front view of an embodiment of the rotary lock system 90, and FIG. 5 is a cut-away perspective rear view of the rotary lock system 90. As shown, the rotary lock system 90 includes a lock housing 120 surrounds the lock member 92. The lock housing 120 may be configured to couple to the housing 70 of the BOP 42, such as via a flange 122 and fasteners 124 (e.g., bolts). As noted above, the housing 70 of the BOP 42 may be a unitary housing or a multi-part housing. For example, as shown in FIG. 5, the housing 70 of the BOP 42 includes a BOP ram housing 126 and a bonnet housing 128 that are coupled to one another via fasteners 129. Regardless of the configuration of the housing 70, the piston 82 of the actuator assembly 80 may be supported within some portion of the housing 70.

The rotary lock system 90 also includes a gear box housing 130 that supports a gear box 132. The gear box 132 may include a gear assembly that includes a drive gear 134, a chain 136, and a driven gear 138. A rotatable starter component 140 (e.g., plate; clutch) may be positioned within the gear box housing 130 and may also be considered part of the gear box 132. The rotary lock system 90 also includes a rotary engine housing 142 that supports the rotary engine and associated components (e.g., additional gears to transfer torque from the rotary engine). An output shaft 144 driven by the rotary engine may extend into the gear box 132 to couple (e.g., non-rotatably) to the drive gear 134. While the lock housing 120, the gear box housing 130, and the rotary engine housing 142 are shown as separate housings that are fastened to one another (e.g., via fasteners), it should be appreciated that these housings may have any suitable form or configuration. Thus, the lock housing 120, the gear box housing 130, and the rotary engine housing 142 may be considered to form a rotary lock system housing 146.

With reference to FIG. 5, the lock housing 120 surrounds the lock member 92 and a stem 152 that engages the lock member 92. An end portion 154 of the stem 152 extends from (e.g., one-piece construction) and/or is coupled (e.g., non-rotatably) to the rotatable starter component 140, such as via a fastener 158. Additionally, bearings 160 may be provided to facilitate rotation of the rotatable starter component 140 relative to the lock housing 120. In operation, rotation of the rotatable starter component 140 drives rotation of the stem 152, which drives rotation of the lock member 92. The stem 152 engages the lock member 92 in a manner that enables the stem 152 to drive the rotation of the lock member 92, while also enabling the lock member 92 to move longitudinally relative to the stem 152 (e.g., toward and away from the rotatable starter component 140). For example, a radially-outer surface of the stem 152 may include one or more radially-extending tabs that engage one or more longitudinally-extending recesses on a radially-inner surface of the lock member 92. Furthermore, a radially-outer surface of the lock member 92 may include threads that engage corresponding threads on a radially-inner surface of a chamber 162 defined within the lock housing 120. Thus, the lock member 92 may be an annular, threaded structure, such as an annular threaded lock screw. The lock member 92, the stem 152, the driven gear 138, and the rotatable starter component 140 may be coaxial, such as along a center lock axis 156. The center lock axis 156 may be aligned with the longitudinal axis 32 and/or may be coaxial with the cavity center axis 76 shown in FIGS. 2 and 3.

In operation, the rotation of the lock member 92 may move the lock member 92 longitudinally through the chamber 162 of the lock housing 120. For example, rotation of the lock member 92 in a first rotational direction may move the lock member 92 in a first longitudinal direction, as shown by arrow 164. Additionally, rotation of the lock member 92 in a second rotational direction may move the lock member 92 in a second longitudinal direction, as shown by arrow 166. In this way, the rotation of the lock member 92 (e.g., via the rotary engine and the gear box 132, which includes the rotatable starter component 140) adjusts the lock member 92 between the first lock position and the second lock position, as described herein with respect to FIGS. 1-3.

As noted above, the gear box 132 includes the drive gear 134, the chain 136, and the driven gear 138. The drive gear 134 and the driven gear 138 each include teeth that engage the chain 136. Thus, in operation, the rotary engine drives rotation of the output shaft 144, which drives rotation of the drive gear 134, the chain 136, and the driven gear 138. The driven gear 138 is configured to engage and to drive rotation of the rotatable starter component 140; however, a circumferential gap between the driven gear 138 and the rotatable starter component 140 may enable effective and reliable adjustment of the lock member 92 during locking and unlocking operations for the BOP 42.

Also, while the rotary engine system 90 and its components may be described with reference to the vertical axis or direction 30, the longitudinal axis or direction 32, and the lateral axis or direction 34 that are also referenced in FIGS. 1-3, it should be appreciated that the rotary engine system 90 may be oriented and positioned in different manners relative to the BOP 42. One non-limiting example is shown in FIG. 5, wherein the rotary lock system 90 is positioned in line with the housing 70 of the BOP 42 along the longitudinal axis 32. As shown, the rotary engine housing 142 is also offset vertically relative to the lock housing 120 and may also bend to extend laterally across the lock housing 120. In this way, the rotary engine system 90 may be compact to facilitate positioning at the housing 70 of the BOP 42.

Figure 6:
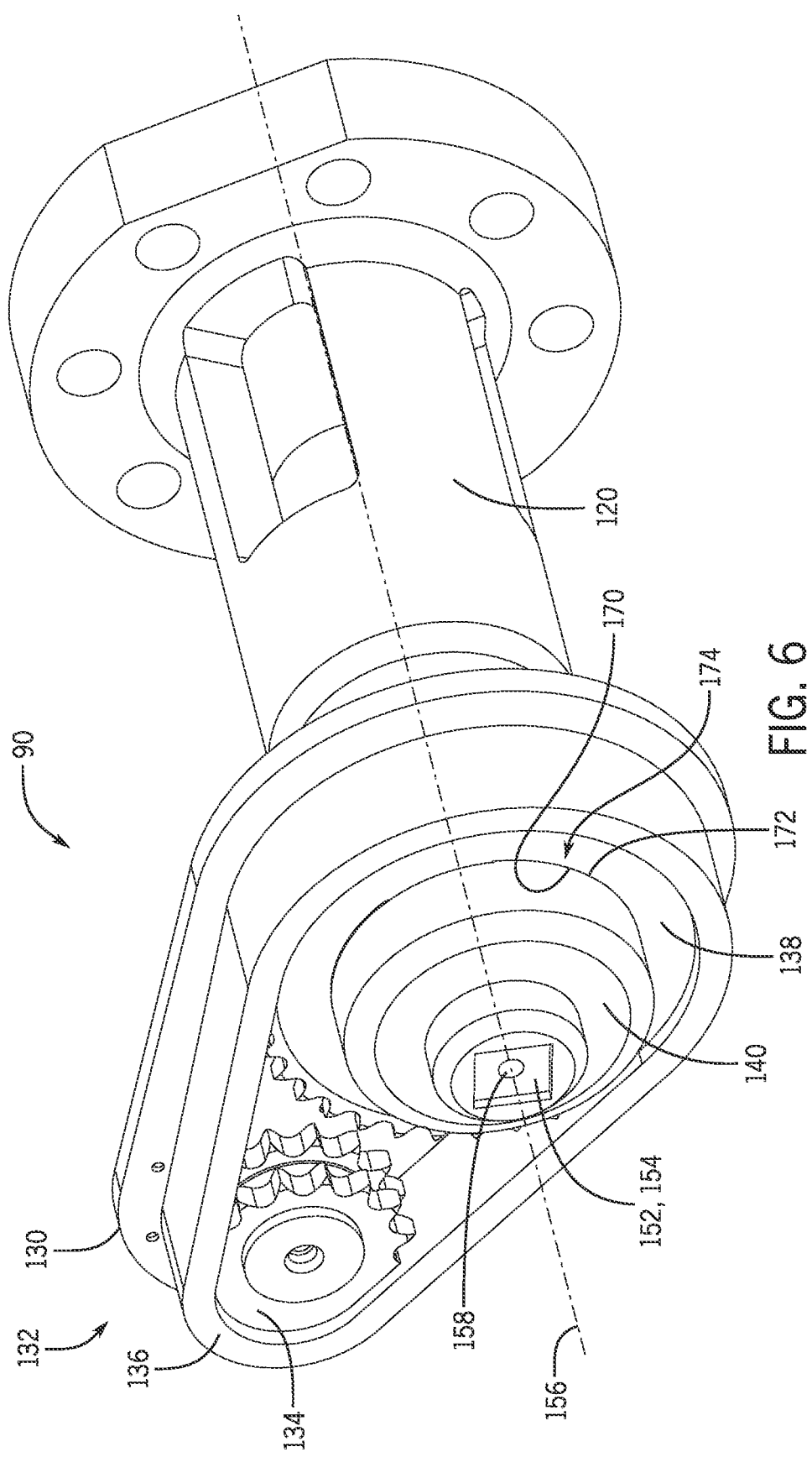
FIG. 6 is a perspective rear view of a portion of the rotary lock system of FIGS. 4 and 5, wherein a rotatable starter component is in engagement with a driven gear, in accordance with an embodiment of the present disclosure.
Figure 7:
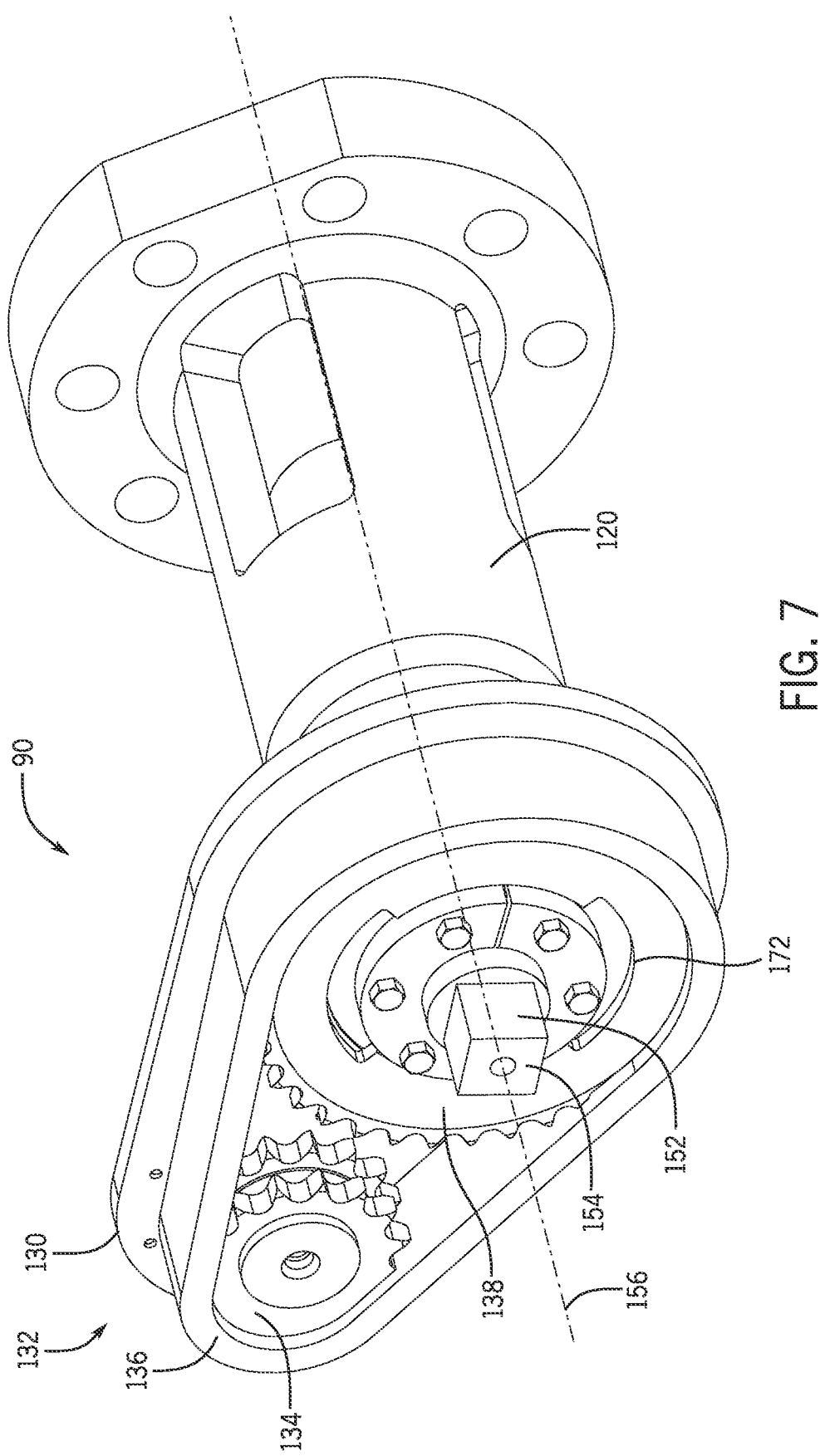
FIG. 7 is a perspective rear view of the portion of the rotary lock system of FIG. 6, wherein the rotatable starter component is removed to illustrate features of the driven gear, in accordance with an embodiment of the present disclosure.

With the foregoing in mind, FIG. 6 is a perspective rear view of a portion of the rotary lock system 90 with the rotatable starter component 140 coupled to the end portion 154 of the stem 152 via the fastener 158, and FIG. 7 is a perspective rear view of the portion of the rotary lock system 90 without the rotatable starter component 140 (e.g., unfastened and separated from the end portion 154 of the stem 152). As shown, the rotary lock system 90 includes the lock housing 120, the gear box housing 130, and the rotary engine housing 142. The gear box 132 includes the drive gear 134, the chain 136, the driven gear 138, and the rotatable starter component 140.

As shown in FIG. 6, when the rotatable starter component 140 is coupled to the stem 152, features 170 of the rotatable starter component 140 engage features 172 of the driven gear 138 to form an interface 174 (e.g., key-slot interface; sliding interface). For example, in the illustrated embodiment, the features 170 of the rotatable starter component 140 are protrusions (e.g., keys) and the features 172 of the driven gear 138 are recesses (e.g., slots) that are configured to receive the protrusions. While two diametrically opposed features 170 and two diametrically opposed features 172 are shown, it should be appreciated that one or more features 170 and one or more features 172 may be provided in any suitable arrangement. The interface 174 enables the rotation of the driven gear 138 to rotate the rotatable starter component 140 and the stem 152 coupled thereto. As discussed in more detail herein, circumferential gaps are provided between the features 170, 172 (e.g., the features 170 are shorter than the features 172 relative to a circumferential axis about the center lock axis 156).

Without the rotatable starter component 140, as shown in FIG. 7, rotation of the driven gear 138 does not rotate the stem 152. That is, the driven gear 138 is not directly coupled to the stem 152 and is rotatable relative to the stem 152. Advantageously, without the rotatable starter component 140, the stem 152 extends through the driven gear 138 and is accessible to enable manual rotation of the stem 152. For example, an operator (e.g., a human operator; a robotic operator, such as a remotely controlled robotic operator, a remotely operated vehicle [ROV], or an autonomously operated vehicle [AUV]; via manual, hydraulic, pneumatic, or electric actuation) may remove a portion of the gear box housing 130, remove the rotatable starter component 140, and then manipulate the stem 152 to rotate the stem 152 and the lock member 92 coupled thereto without rotating or otherwise interfering with the rotary engine or remaining components of the gear box 132. This may be useful during certain operations and/or as a backup method to adjust the lock member 92 to perform the locking functions for the BOP 42.

Figure 8:
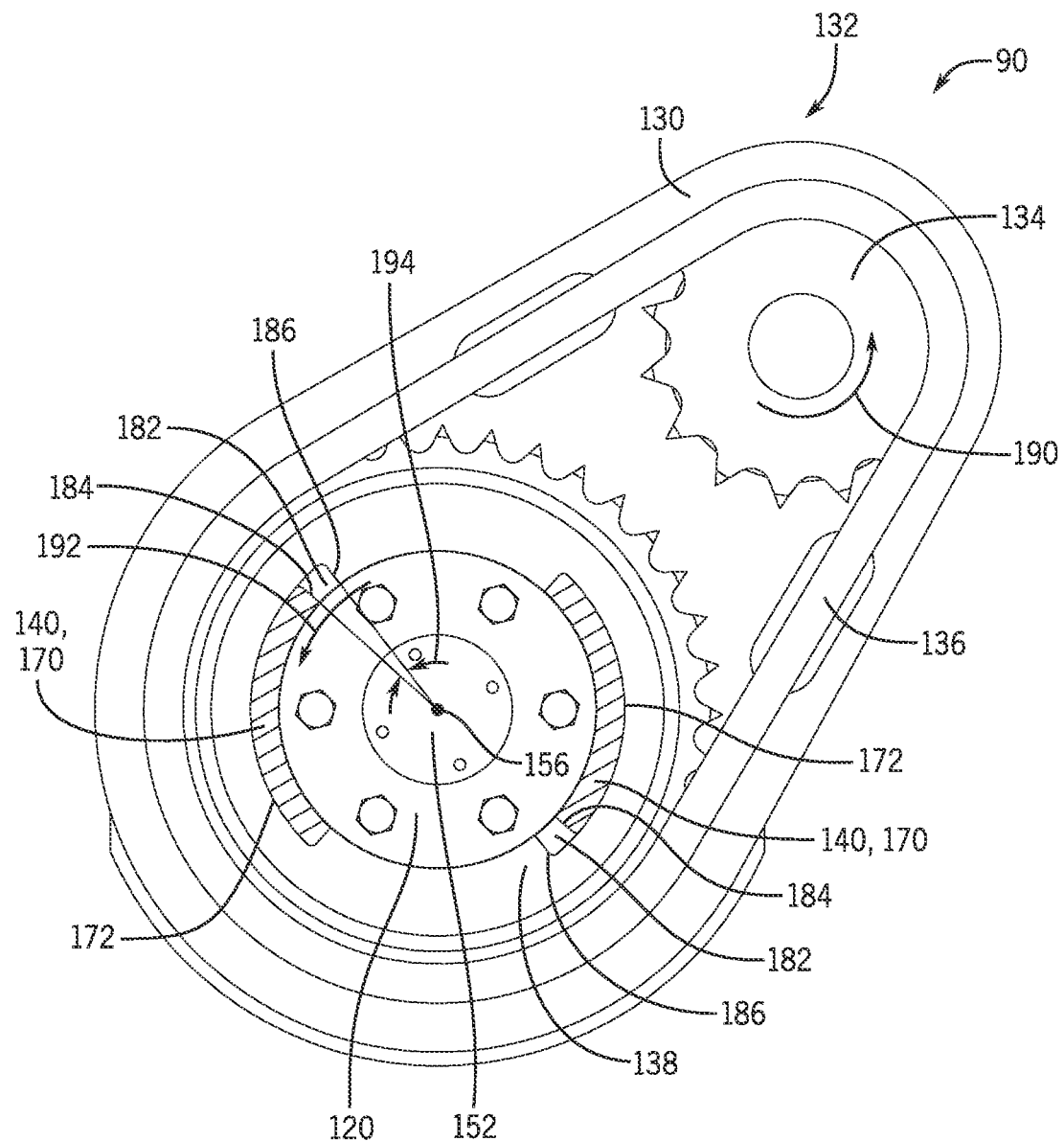
FIG. 8 is a cross-sectional rear view of a portion of the rotary lock system of FIGS. 4 and 5 at an initial step prior to an unlocking operation, in accordance with an embodiment of the present disclosure.
Figure 9:
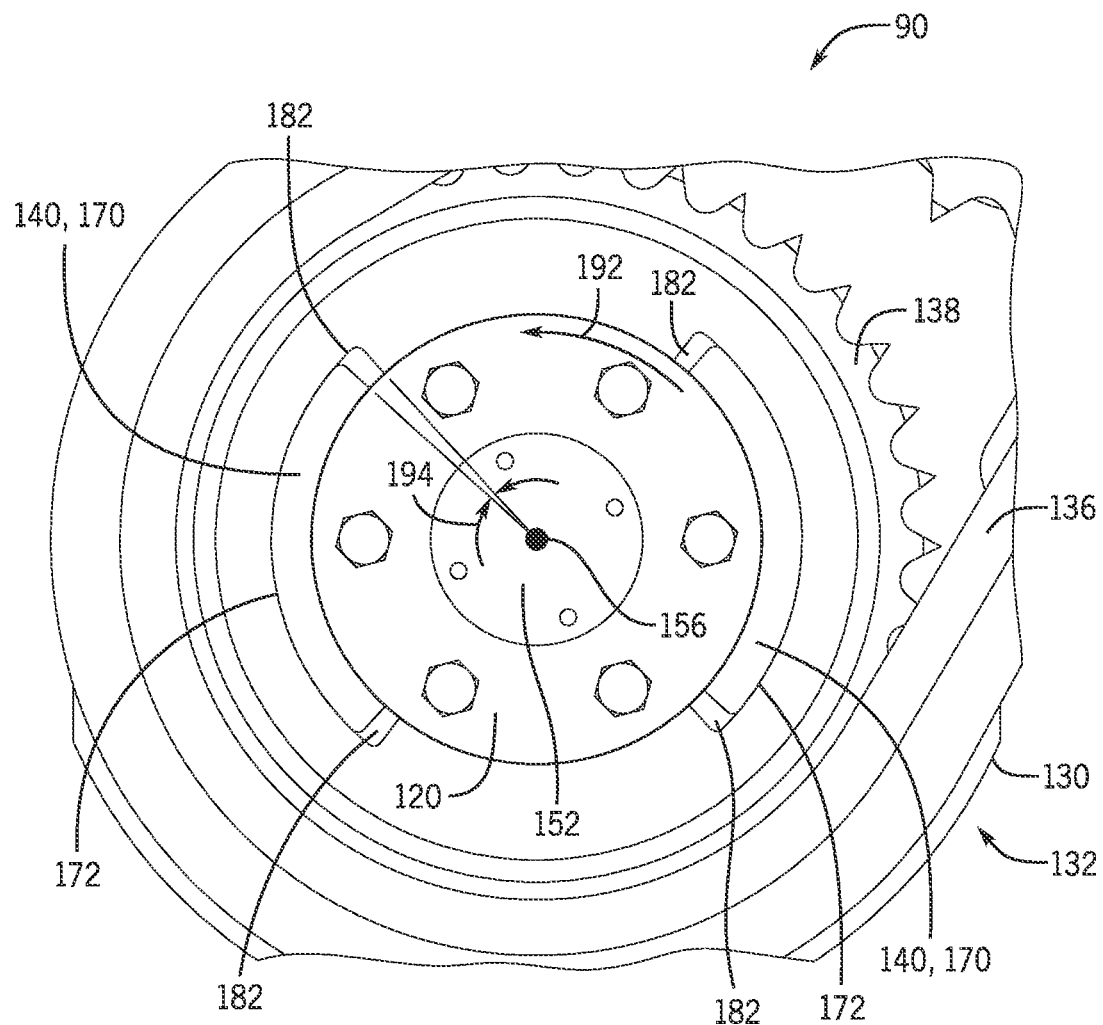
FIG. 9 is a cross-sectional rear view of part of the portion of the rotary lock system of FIG. 8 at an intermediate step during the unlocking operation, in accordance with an embodiment of the present disclosure.
Figure 10:
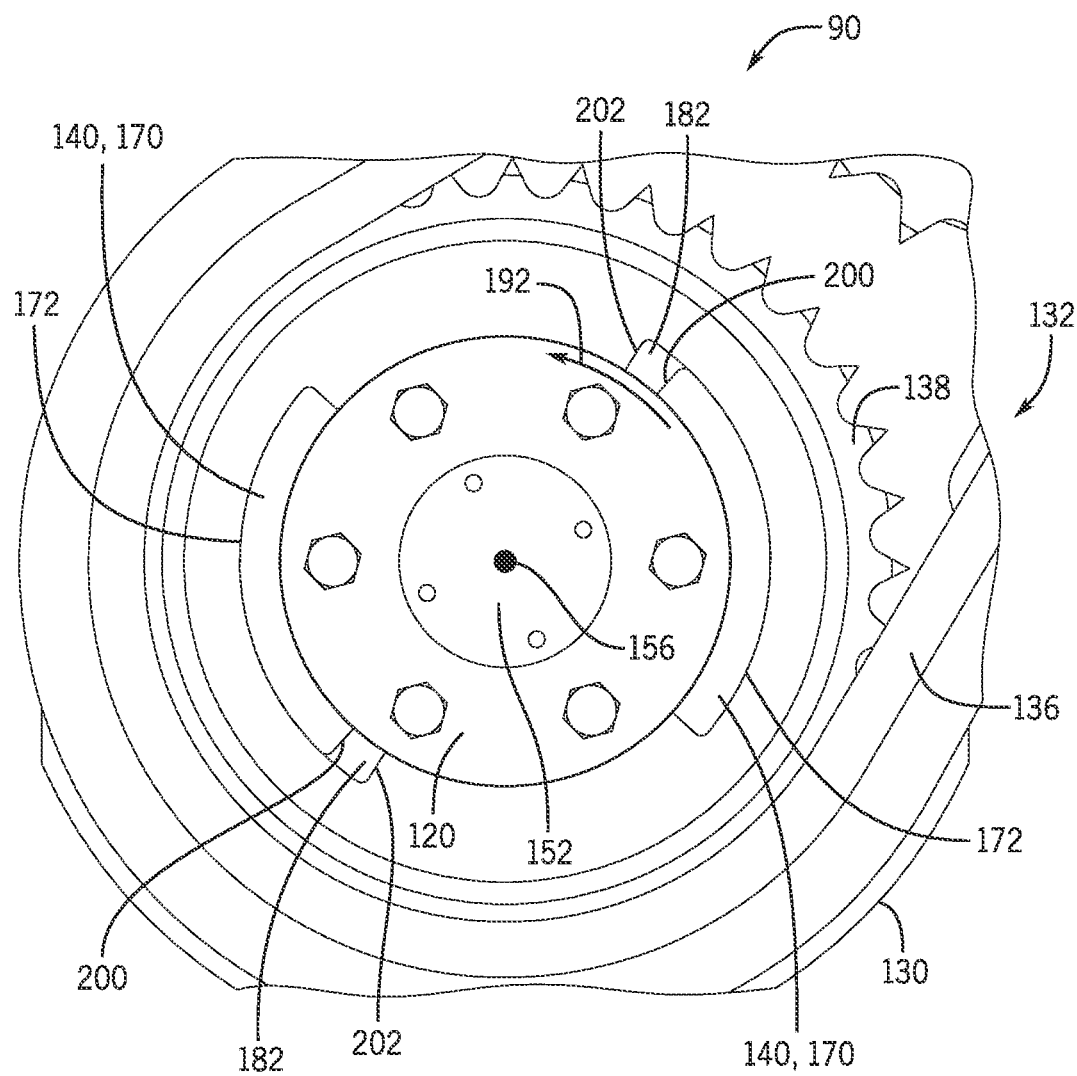
FIG. 10 is a cross-sectional rear view of part of the portion of the rotary lock system of FIG. 8 at a final step during the unlocking operation, in accordance with an embodiment of the present disclosure.

FIGS. 8-10 illustrate movement of certain components of the rotary lock system 90 during operation of the rotary lock system 90. In particular, FIG. 8 is a cross-sectional rear view of a portion of the rotary lock system 90 at an initial step (e.g., first step or time prior to an unlocking operation, FIG. 9 is a cross-sectional rear view of a part of the portion of the rotary lock system 90 at an intermediate step (e.g., second step or time) during the unlocking operation, and FIG. 10 is a cross-sectional rear view of a part of the portion of the rotary lock system 90 at a final step (e.g., third step or time) during the unlocking operation. To facilitate discussion, a rear portion of the gear box housing 130 and a rear portion (e.g., cap portion; all except the features 170) of the rotatable starter component 140 are omitted from FIGS. 8-10.

As shown, the gearbox housing 130 includes the gear box 132 having the drive gear 134, the chain 136, the driven gear 138, and the rotatable component 140. The rotatable starter component 140 includes the features 170, and the driven gear 138 includes the features 172. In the illustrated embodiment, the features 172 are recesses, and the features 170 are protrusions. The features 170 are smaller than the features 172 (e.g., along the circumferential axis about the central lock axis 156), and thus, circumferential gaps 182 are provided between the features 170 and the features 172.

With reference to FIG. 8, prior to the unlocking operation (e.g., at time=0), the rotary engine has no power supply and provides no torque (e.g., stationary; off). The features 170 are positioned within the features 172, and the circumferential gaps 182 are defined between respective contacting surfaces 184 of the features 170 and respective contacting surfaces 186 of the features 172 (e.g., at respective first ends of the features 170).

Upon instruction (e.g., from the electronic controller 112), power supply is provided to the rotary engine. The rotary engine may drive rotation of the drive gear 134 in a first rotational direction shown by arrow 190, which results in rotation of the driven gear 138 in a second rotational direction shown by arrow 192. Due to the circumferential gaps 182, the driven gear 138 will rotate through an angle 194 without driving rotation of the rotatable starter component 140. Thus, the rotary engine makes a defined number of turns without driving the rotation of the rotatable starter component 140.

When the driven gear 138 finally contacts and drives the rotation of the rotatable starter component 140 (e.g., when the second surface 186 of the driven gear 138 finally contacts and drives the contacting surface 184 of the rotatable starter component 140), the rotary engine provides a full torque that is a maximum torque or is otherwise higher than would have been provided without the circumferential gaps 182. Indeed, without the disclosed embodiments (e.g., without the starter engine system; with direct connection between the rotary engine and the lock member 92), the rotary engine has no time to turn to achieve the full torque before an initial torque is applied to the rotatable starter component 140 and may not provide sufficient torque to overcome existing forces to initiate the unlocking operation. With the disclosed embodiments, the rotary lock system 90 advantageously provides the full torque to the lock member 92 in a manner that effectively and reliably adjust the lock member 92 to provide the unlocking function to the BOP 42.

With reference to FIG. 9, during the unlocking operation (e.g., at time=1), the torque increases as the angle 194 decreases. With reference to FIG. 10, during the unlocking operation (e.g., at time=2), the torque reaches the full torque as the angle 194 decreases to zero (e.g., prior to or as the second surface 186 of the driven gear 138 finally contacts and drives the contacting surface 184 of the rotatable starter component 140). The full torque is sufficient to drive the rotatable starter component 140 and the stem 152 coupled thereto, which in turn drives the lock member 92 and causes the lock member 92 to move within the lock housing 120 (e.g., in a first direction along the longitudinal axis).

As shown in FIG. 10, during the unlocking operation and after the unlocking operation, the circumferential gaps 182 are defined between respective contacting surfaces 200 of the features 170 and respective contacting surfaces 202 of the features 172 (e.g., at respective first ends of the features 170). During a subsequent locking operation, the circumferential gaps 182 may operate in a similar manner to enable the full torque to initiate the locking operation. In particular, upon instruction (e.g., from the electronic controller 112), power supply is provided to the rotary engine. The rotary engine may drive rotation of the drive gear 134 in the second rotational direction (e.g., with the arrow 192, and opposite the arrow 190), which results in rotation of the driven gear 138 in the first rotational direction (e.g., with the arrow 190, and opposite the arrow 192). Due to the circumferential gaps 182, the driven gear 138 will rotate through the angle without driving rotation of the rotatable starter component 140. During the locking operation (e.g., at time=1), the torque increases as the angle decreases. Then, during the locking operation (e.g., at time=2), the torque reaches the full torque as the angle decreases to zero (e.g., prior to or as the contacting surface 202 of the driven gear 138 finally contacts and drives the contacting surface 200 of the rotatable starter component 140). The full torque is sufficient to drive the rotatable starter component 140 and the stem 152 coupled thereto, which in turn drives the lock member 92 and causes the lock member 92 to move within the lock housing 120 (e.g., in a second direction along the longitudinal axis). Thus, the rotary engine makes a defined number of turns without driving the rotation of the rotatable starter component 140 during both locking operations and unlocking operations.

It should be appreciated that any of the features illustrated and described with respect to FIGS. 1-10 may be combined in any suitable manner. While the disclosure may be susceptible to various modifications and alternative forms, specific embodiments have been shown by way of example in the drawings and have been described in detail herein.

The invention claimed is:

1. A rotary lock system, comprising:
   a rotatable starter component; and
   a driven gear configured to engage and to drive rotation of the rotatable starter component via an interface that comprises a circumferential gap to enable the driven gear to circumferentially rotate in a sequence of:
      a first rotational motion through an angle to close the circumferential gap, wherein the driven gear does not apply a sufficient torque to rotate the rotatable starter component during the first rotational motion; and
      a second rotational motion after closure of the circumferential gap and contact between opposing surfaces of the driven gear and the rotatable starter component, wherein the driven gear applies a full torque to rotate the rotatable starter component during the second rotational motion.

2. The rotary lock system of claim 1, wherein the interface comprises a key-slot interface comprising a key disposed in a slot, and the first rotational motion moves the key from a first circumferential end of the slot to an opposite circumferential end of the slot to close the circumferential gap.

3. The rotary lock system of claim 2, wherein the driven gear comprises one or more additional slots and the rotatable starter component comprises one or more additional keys that are configured to engage the one or more slots to form the key-slot interface.

4. The rotary lock system of claim 1, wherein the driven gear and the rotatable starter component are coaxial.

5. The rotary lock system of claim 1, comprising a lock member that is coupled to the rotatable starter component such that the lock member is configured to rotate with the rotatable starter component.

6. The rotary lock system of claim 5, comprising:
   a stem that extends from the rotatable starter component; and
   an annular threaded screw positioned about the stem and threadably coupled to a lock housing to enable the annular threaded screw to move longitudinally along the stem as the lock member rotates with the rotatable starter component.

7. The rotary lock system of claim 6, wherein the stem is coupled to the rotatable starter component via a fastener such that the stem extends from the rotatable starter component.

8. The rotary lock system of claim 1, comprising:
   a stem configured to couple to the rotatable starter component; and
   a lock member coupled to the stem such that the lock member is configured to rotate with the stem;
   wherein the stem is accessible to enable manual rotation of the stem and the lock member coupled thereto after separation of the rotatable starter component from the stem.

9. The rotary lock system of claim 1, wherein the interface comprises the circumferential gap between the opposing surfaces of a first structure of the driven gear and a second structure of the rotatable starter component.

10. The rotary lock system of claim 1, comprising a rotary lock system housing that surrounds the driven gear and the rotatable starter component, wherein the rotary lock system housing comprises a flange that is configured to couple to a housing of a blowout preventer (BOP) via a plurality of fasteners to enable the rotary lock system to lock a ram of the BOP.

11. A blowout preventer (BOP) system, comprising:
   a rotary lock system housing of a rotary lock system, the rotary lock system housing configured to couple to a BOP housing;
   a rotatable starter component within the rotary lock system housing;
   a driven gear configured to engage and to drive rotation of the rotatable starter component via an interface that comprises a circumferential gap to enable the driven gear to circumferentially rotate in a sequence of:
      a first rotational motion through an angle to close the circumferential gap, wherein the driven gear does not apply a sufficient torque to rotate the rotatable starter component during the first rotational motion; and
      a second rotational motion after closure of the circumferential gap and contact between opposing surfaces of the driven gear and the rotatable starter component, wherein the driven gear applies a full torque to rotate the rotatable starter component during the second rotational motion; and
   a lock member within the rotary lock system housing and coupled to the rotatable starter component such that the lock member is configured to rotate with the rotatable starter component.

12. The BOP system of claim 11, comprising:
   the BOP housing; and
   a ram supported within the BOP housing, wherein the ram is configured to move within the BOP housing between an open position in which the ram is withdrawn from a central bore and a closed position in which the ram is positioned within the central bore to thereby block a fluid flow through the central bore.

13. The BOP system of claim 12, wherein the lock member is configured to move within the rotary lock system housing between a locked position and an unlocked position, and the lock member is configured to block movement of the ram within the BOP housing while the lock member is in the locked position.

14. The BOP system of claim 11, wherein the lock member is threadably coupled to the rotary lock system housing such that the lock member is configured to move toward and away from the rotatable starter component as the lock member rotates with the rotatable starter component.

15. The BOP system of claim 11, wherein the interface comprises a key-slot interface comprising a key disposed in a slot, and the first rotational motion moves the key from a first circumferential end of the slot to an opposite circumferential end of the slot to close the circumferential gap.

16. The BOP system of claim 11, wherein the driven gear, the rotatable starter component, and the lock member are coaxial.

17. The BOP system of claim 11, wherein the rotary lock system comprises a stem that extends from the rotatable starter component, and the lock member is coupled to the stem such that the lock member is configured to rotate with the rotatable starter component.

18. The BOP system of claim 17, wherein the stem is coupled to the rotatable starter component via a fastener such that the stem extends from the rotatable starter component.

19. A method of operating a rotary lock system, the method comprising:

driving a gear to circumferentially rotate along a first rotational motion through an angle to close a circumferential gap without driving a rotatable starter component, wherein the gear does not apply a sufficient torque to rotate the rotatable starter component during the first rotational motion;

initiating contact between the gear and the rotatable starter component after closure of the circumferential gap via driving the gear to rotate along the first rotational motion through the angle;

driving the rotatable starter component to rotate along a second rotational motion with the gear via the contact between the gear and the rotatable starter component, wherein the gear applies a full torque to rotate the rotatable starter component during the second rotational motion; and adjusting a lock member that is non-rotatably coupled to the rotatable starter component to move between a locked position and an unlocked position via driving the rotatable starter component to rotate with the gear.

20. The method of claim 19, comprising:

removing the rotatable starter component from a stem that is non-rotatably coupled to the lock member; and manually rotating the stem to adjust the lock member to move between the locked position and the unlocked position without the rotatable starter component.

* * * * *